United States Patent
Yamada et al.

(10) Patent No.: US 7,320,527 B2
(45) Date of Patent: Jan. 22, 2008

(54) MIRROR AND ANGLE DETECTION DEVICE

(75) Inventors: Ayako Yamada, Fujieda (JP); Hidenori Sato, Fujieda (JP)

(73) Assignee: Murakami Corporation, Shizuoka-shi ( * ) Notice: Subject to any disclaimer, the term of this patent is extended or adjusted under 35 U.S.C. 154(b) by 0 days.

(21) Appl. No.: 11/235,211

(22) Filed: Sep. 27, 2005

(65) Prior Publication Data

US 2006/0066966 A1 Mar. 30, 2006

(30) Foreign Application Priority Data

Sep. 29, 2004 (JP) ............................. 2004-283783

(51) Int. Cl.
G02B 7/182 (2006.01)
G60R 1/06 (2006.01)

(52) U.S. Cl. ..................... 359/872; 359/873; 359/874; 359/876; 359/877

(58) Field of Classification Search ............... 359/873, 359/874, 876, 877, 841, 872
See application file for complete search history.

(56) References Cited

U.S. PATENT DOCUMENTS

| | | | | |
|---|---|---|---|---|
| 4,151,757 A | * | 5/1979 | Pitrat .......................... | 74/502.1 |
| 4,482,211 A | * | 11/1984 | Fisher .......................... | 359/877 |
| 4,540,252 A | * | 9/1985 | Hayashi et al. ............... | 359/874 |
| 4,696,555 A | * | 9/1987 | Enomoto ...................... | 359/874 |
| 4,824,232 A | * | 4/1989 | Thompson ................... | 359/873 |
| 4,875,764 A | * | 10/1989 | Marino et al. ............... | 359/849 |
| 4,915,493 A | * | 4/1990 | Fisher et al. ................. | 359/874 |
| 4,940,321 A | * | 7/1990 | Yoshida ....................... | 359/874 |
| 4,948,242 A | * | 8/1990 | Desmond et al. ............ | 359/877 |
| 5,035,497 A | * | 7/1991 | Itoh ............................. | 359/849 |
| 5,115,351 A | * | 5/1992 | Miyawaki et al. ........... | 359/849 |
| 5,226,034 A | * | 7/1993 | Nagayama et al. .......... | 359/873 |
| 5,343,333 A | * | 8/1994 | Nagayama et al. .......... | 359/874 |
| 5,436,769 A | * | 7/1995 | Gilbert et al. ............... | 359/874 |

(Continued)

FOREIGN PATENT DOCUMENTS

EP   1 084 906 A2   3/2001

(Continued)

OTHER PUBLICATIONS

U.S. Appl. No. 11/194,538, filed Aug. 2, 2005, Yamada.

(Continued)

Primary Examiner—Ricky D. Shafer
(74) Attorney, Agent, or Firm—Oblon, Spivak, McClelland, Maier & Neustadt, P.C.

(57) ABSTRACT

A vehicle mirror comprises: a mirror surface; an actuator 100 which tilts the mirror surface; a plate pivot 110, which changes its direction together with the mirror surface; a spring 112, which applies a resilient force to the plate pivot 110 in the direction substantially vertical to the mirror surface; a guide spring 114 which is fitted to the end of the spring 112 at the side far from the interlocking member; a semiconductor pressure sensor 116, which is in contact with the guide spring at substantially one point so as to detect a load loaded on the one point from the pressing member; and a signal outputting portion which outputs a signal depending upon the tilted angle of the mirror surface based on the force detected by the semiconductor pressure sensor 116.

9 Claims, 8 Drawing Sheets

U.S. PATENT DOCUMENTS

| | | | | |
|---|---|---|---|---|
| 5,993,018 | A * | 11/1999 | Hattori et al. | 359/877 |
| 6,000,805 | A * | 12/1999 | Inagaki | 359/871 |
| 6,069,420 | A * | 5/2000 | Mizzi et al. | 310/40 MM |
| 6,412,960 | B1 * | 7/2002 | Yoshida et al. | 359/843 |
| 2002/0176181 | A1 * | 11/2002 | Jacobsen | 359/877 |
| 2004/0047054 | A1 * | 3/2004 | Kikuchi | 359/877 |
| 2004/0114261 | A1 | 6/2004 | Ohashi | |
| 2005/0225886 | A1 * | 10/2005 | Yamada | 359/877 |
| 2006/0066967 | A1 * | 3/2006 | Yamada et al. | 359/874 |
| 2006/0066968 | A1 * | 3/2006 | Yamada | 359/877 |

FOREIGN PATENT DOCUMENTS

| | | | |
|---|---|---|---|
| JP | 10-67281 | * | 3/1998 |
| JP | 10-264726 | | 10/1998 |
| JP | 11-5491 | * | 1/1999 |

OTHER PUBLICATIONS

U.S. Appl. No. 11/195,761, filed Aug. 3, 2005, Yamada et al.
Patent Abstracts of Japan, JP 59-108928, Jun. 23, 1984.

* cited by examiner

MIRROR AND ANGLE DETECTION DEVICE

CROSS REFERENCE TO RELATED

The present application claims priority under 35 U.S.C. §119 of Japanese Patent Application No. 2004-283783, filed on Sep. 29, 2004, entitled "MIRROR AND ANGLE DETECTION DEVICE". The contents of that application are incorporated herein by reference in their entirety.

BACKGROUND ART

1. Field of the Invention

The present invention relates to a mirror and an angle detection device. More specifically, the present invention relates to an exterior mirror for vehicles, and an angle detection device for detecting a tilted angle of a mirror surface of the exterior mirror.

2. Description of the Related Arts

There is an exterior mirror having an angle adjusting device, which adjusts tilted angle of the exterior mirror to obtain good rear side view. In such an exterior mirror, the tilted angle of the mirror surface can be adjusted to meet the viewing angle of the driver. However, since it is complicated to delicately readjust the tilted angle whenever the driver is changed, it is desired to reproduce the tilted angle suitable for respective driver.

Various suggestions have been made to detect the tilted angle for reproducing the tilted angle of the mirror surface. For example, an angle detecting device having a resistor, slidable connect which slides the resistor according to the variation (tilting) of the mirror surface has been suggested. According to this device, since the slidable connect moves to meet the tilting of the mirror surface to change the voltage, the voltage can be detected to thereby detect the tilted angle (For Example, see Japanese Patent Laid-Open No. 10-264726, hereinafter referred to as Patent Document 1). An angle detection device has also be well-known, which utilizes a magnet and Hall element to detect the tilted angle of the mirror surface depending on the strength of the magnetic force changed by tilting the mirror surface.

However, in the case of the angle detection device, for example, utilizing a slidable connect, since the resistor is worn by the sliding, the output is sometimes changed. Also, worn dusts and sliding noise will be disadvantageously generated.

In the angle detection device utilizing a magnet, due to the influence of the magnetism of the motor or such for tilting the mirror surface sometimes changes the output. Also, the position of the magnet and Hall element are restriction, sometimes making the freedom of the design narrow. Also, the use of the magnet, which is expensive, arises a problem for requiring much more cost. Also, when the slidable connect or the magnetic is used, hysteresis will be generated in the output.

An object of the present invention is, therefore, to provide a mirror and an angle detection device which can solve the problems associated with the prior arts.

SUMMARY OF THE INVENTION

The present invention, which attains the object has the following configuration.

(Configuration 1)

A vehicle mirror comprises: a mirror surface; an actuator which tilts the mirror surface around an axis parallel to said mirror surface as a center; an interlocking member, which changes its direction together with the mirror surface so as to be directed toward the direction same as the direction of the mirror surface; a spring, which applies a resilient force to said interlocking member in the direction substantially the vertical to the mirror surface; a pressing member which is fitted to the end of the spring at the side far from the interlocking member; a sensor for detecting a pressing force, which is in contact with said pressing member at substantially one point so as to detect a load loaded on said one point from the pressing member; and a signal outputting portion which outputs a signal depending upon the tilted angle of said mirror surface based on the force detected by said sensor for detecting a pressing force. The sensor for detecting a pressing force is, for example, a semiconductor pressure sensor, a load sensor, a deformation gauge or such. The interlocking member may be a member passively moving according the movement of the mirror surface such as a mirror holder, and may be a member for positively moving to drive the mirror surface such as a plate pivot. The interlocking member may also be a part of the mirror surface. The term "d direction substantially vertical to the mirror surface" is, for example, the direction perpendicular to the mirror surface, when the mirror is not tilted.

According to this configuration, the movement of the mirror surface is converted into the change in the load via the spring, whereby the tilted angle of the mirror surface can be suitably detected. Sine expensive member such as magnet is not necessary, the cost of the mirror can be reduced. Different from the case of using the magnet in which identification of the N pole and S pole are required, no fitting direction is required and, thus, a mistake of fitting and the like would not occur. For this reason, according to this configuration, the stage failure can be decreased. Also, since slidable connect which will be worn, is not used, for example, in comparison with the variable resistor utilizing a slidable connect, the durability is enhanced, and generation of noise can be decreased.

What is more, since the sensor for detecting a pressing force is in contact with the pressing member at a point, the influence of the tilting of the spring can be decreased. For this reason, hysteresis of the load from the spring in the increasing direction and decreasing direction can be suppressed. For this reason, according to this configuration, the accuracy of detecting the tilted angle of the mirror surface can be improved, and high performance mirror can be realized.

For example, when the spring and the sensor for detecting a pressing force are directly brought into contact with each other without using the pressing member or when the sensor for detecting a pressing force is in contact with the pressing member at a surface, depending on the sensitivity of the sensor for detecting a pressing force or depending on how to contact, there is a possibility to bring about a gap between the detected value in the load-increasing direction and load-decreasing direction (detected value). Also, there is a possibility to change the detected value when the spring is tilted.

(Configuration 2)

The sensor for detecting a pressing force may be a semiconductor pressure sensor. The semiconductor pressure sensor may be, for example, packaged with the same substrate as that packaged in the circumference electric circuit including a signal outputting portion and, thus, unevenness of assembly can be decreased. For this reason, according to this configuration, the productivity of the mirror can be enhanced.

(Configuration 3)

The spring may be a helical spring; and the pressing member may be a globular member provided between the edge of said helical spring and said sensor for detecting a pressing force. According to this configuration, the load by the spring can be suitably delivered to the sensor for detecting a pressing force. The globular member is, for example, a bowl shaped globular member such as a steel-made bowl. The globular member may be an elliptic globular member.

(Configuration 4)

The actuator may possess a slide rod which moves toward or backward the rear surface of the mirror surface to thereby tilt the mirror surface; and at least part of the spring is inserted into the slide rod to apply a resilient force to the interlocking member via the slide rod. According to this configuration, the spring, the pressing member, and the like can be placed with good efficiency.

(Configuration 5)

An angle detecting device for detecting the tilted angle of the mirror surface of a vehicle mirror, comprises: a spring, which applies a resilient force to an interlocking member, which changes its direction together with the mirror surface so as to be directed toward the direction same as the direction of the mirror surface, in the direction substantially the vertical to the mirror surface; a pressing member which is fitted to the end of the spring at the side far from the interlocking member; a sensor for detecting a pressing force, which is in contact with said pressing member at substantially one point so as to detect a load loaded on said one point from the pressing member; and a signal outputting portion which outputs a signal depending upon the tilted angle of said mirror surface based on the force detected by said sensor for detecting a pressing force. According to this configuration, effects similar to those of Configuration 1 can be obtained.

According to the present invention, the tilted angle of the mirror surface can be suitably detected.

BRIEF DESCRIPTION OF THE DRAWINGS

FIG. 5 is a drawing which describes the signal outputting portion 124, wherein

DESCRIPTION OF PREFERRED EMBODIMENTS

Figure 1:
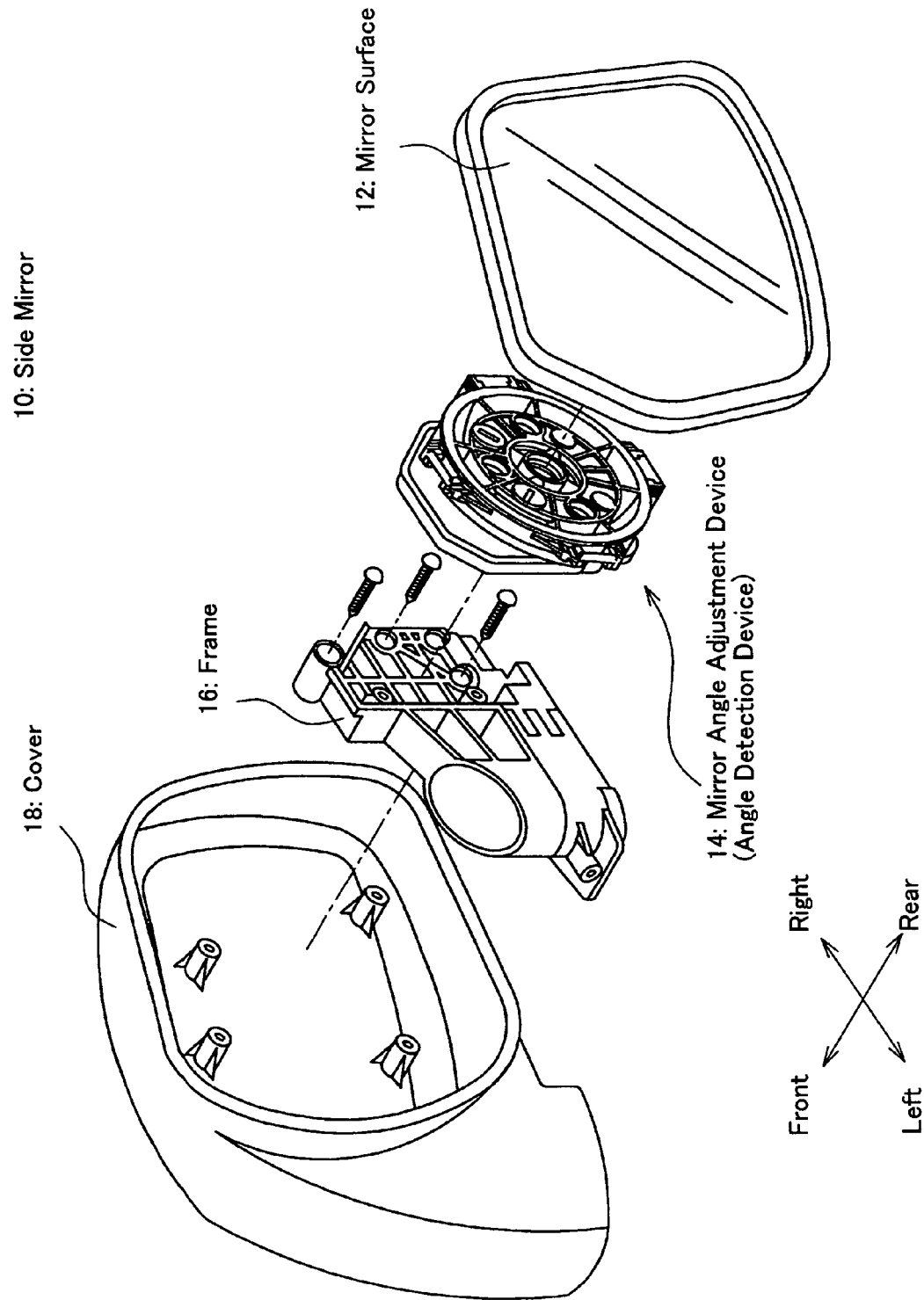
FIG. 1 is an explored perspective view showing one example of the configuration of the side mirror according to one embodiment of the present invention.

Embodiments according to the present invention will now be described by referring to the drawings.

FIG. 1 is an explored perspective view showing one example of the configuration of the side mirror according to one embodiment of the present invention. The side mirror 10 is a vehicle exterior mirror and possesses a cover 18, a mirror surface 12, a frame 16, and a mirror angle adjustment device 14.

The cover 18 is a mirror body which covers the outside of the side mirror 10, and accommodates the frame 16 and the mirror angle adjustment device 14. The cover 18 has an opening at the rear side of the vehicle, and holds the mirror surface 12 on the opening in a tilting manner. The mirror surface 12 is fitted to the opening of the cover 18 in such a manner that the reflecting surface thereof is directed toward the rear side of the vehicle.

The frame 16 is a base fixed onto the cover 18, and holds the mirror angle adjustment device 14 in a state directed toward the rear surface of the mirror surface 12. The term "rear surface of the mirror surface 12" intended herein is a surface directed toward the opposite direction of the reflecting surface.

The mirror angle adjustment device 14 is a device for tilting the mirror surface. In this embodiment, the mirror angle adjustment device 14 has a function of an angle detection device, which detects the tilted angle of the mirror surface 12, and which adjusts the tilted angle of the mirror surface 12 so as to accord the detected value with previously memorized angle. According to this configuration, the mirror angle adjustment device 14 serves as a mirror (memory mirror), which adjusts the tilted angle of the mirror surface to meet the previously memorized view position of the driver.

Figure 2:
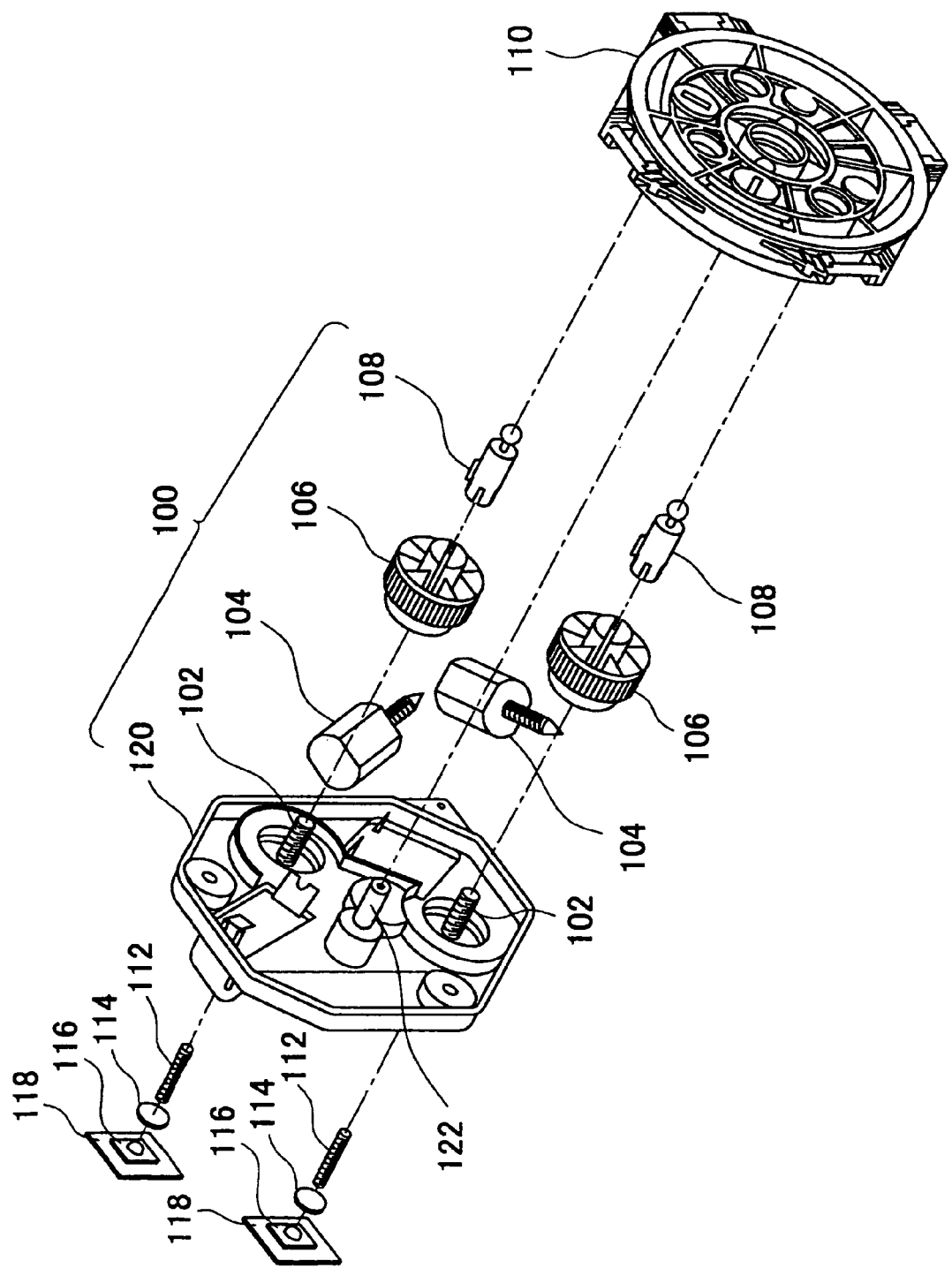
FIG. 2 is an explored perspective view showing a first example of the configuration of the mirror angle adjustment device 14.

FIG. 2 is an explored perspective view showing a first example of the configuration of the mirror angle adjustment device 14. The mirror angle adjustment device 14 possesses a plate pivot 110, an actuator 100, a spring 112, a guide spring 114, a semiconductor pressure sensor 116, and a substrate 118.

The plate pivot 110 is a plate member which is tilted by the moving force of the actuator 100, and holds the rear surface of the mirror surface 12 (see FIG. 1) so that the state is kept where it is parallel to the mirror surface 12. According to this configuration, the mirror surface 12 can be tilted interlocking with the plate pivot 110. For this reason, in this embodiment, the plate pivot 110 serves as an interlocking member, which positively moves to change it direction together with the mirror surface 12.

The actuator 100 includes a housing 120, two pairs of motors 104 and worm wheels 106, and adjust nuts 108. The housing 120 is provided so as to be facing the mirror surface 12 across the plate pivot 110, and holds the motors 104, worm wheels 106 and the adjust nuts 108 between the actuator 100 and the plate pivot 110.

The housing 120 possesses a center support portion 122 and two male screws projecting toward the plate pivot 110 respectively. The center support portion 122 supports the center portion of the plate pivot 110 so that the plate pivot 110 can be freely tilted around the axis passing through the central portion of the plate pivot 110. These two male screws 102 project toward a point on the rotation axis of the plate pivot 110 in the horizontal direction, and the rotation axis of the plate pivot 110 in the vertical direction, respectively.

The term "the rotation axis of the plate pivot 110 in the horizontal direction" intended herein is a horizontal axis parallel to the mirror surface 12, for example, for tilting the plate pivot 110. The term "the rotation axis of the plate pivot 110 in the vertical direction" intended herein is an axis perpendicular to the mirror surface 12, for example, for tilting the plate pivot 110. The term "the central portion of the plate pivot 110" intended herein is a point of intersection between the rotation axis of the plate pivot 110 in the horizontal direction and the rotation axis of the plate pivot 110 in the vertical direction. The central portion of the plate pivot 110 may be a fulcrum of tilting the plate pivot 110. One motor 104, one worm wheel 104, and one adjust nuts 108 are provided corresponding to two male screw portions 102, respectively.

The motor 104 has a worm gear engaged with the external circumference of the worm wheel 106, and is held by the housing. The worm wheel 106 is in a substantially column shape having gear engaged with the worm gear of the motor 104 formed on the external circumference thereof, and is held by the housing 120 in a rotatable manner. Into the inner circumference of the worm wheel 106 is pierced through the male screw portion 102.

The adjust nut 108 is one example of a slide rod which moves forward and backward relative to the rear surface of the mirror surface 12, to thereby tilt the mirror surface 12. In this embodiment, the adjust nut 108 is inserted into the inner surface of the worm wheel 106 from the opposite side of the male screw portion 102, and is screwed with the male screw portion 102. The adjust nut 108 is held by the worm wheel 106 in such a manner that it is not relatively rotated around the worm wheel, and can be moved toward the axis direction of the worm wheel. The end of the adjust nut 108 far from the male screw portion 102 is engaged with the rear surface of the pivot plate 110.

In this embodiment, when the motor 104 is rotated, the worm wheel 106 corresponding to the rotated motor 104 is rotated according to the rotation of the rotated motor 104 together with the adjust nut 108 around the male screw portion 102 as a center. According to this rotation, the adjust nut 108 screwed with the male screw portion 102 is guided to the groove of the male screw portion 102 to move toward or backward in the axis direction of the male screw direction.

The pivot plate 110, which is engaged with the adjust nut 108 at the rear surface thereof, is tilted around the rotation axis in the horizontal direction or the rotation axis in the vertical axis as a center depending upon the movement of the adjust nut 108. The plate pivot 110 tilts the mirror surface 12 to be accorded with the tilting of the plate pivot 110 itself. As described above, the actuator 100 tilts the mirror surface 12 around the axis parallel to the mirror surface 12.

The spring 112, the guide spring 114, the semiconductor pressure sensor 116, and the substrate 118 are configuration for detecting the tilted angle of the mirror surface 12, and two springs 112 and, two guide springs 114 and two semiconductor pressure sensors 116 are provided corresponding to two adjust nuts 108. The spring 12 is a helical spring which applies a resilient force to the adjust nut 108 toward the plate pivot 110. The guide spring 114 is a plate member fitted to the edge of the spring 112 at the side far from the plate pivot 110, and presses the semiconductor pressure sensor 11 according to the resilient force of the spring 112. The guide spring 114 is one example of the pressing member. The semiconductor pressure sensor 116 is one example of the sensor for detecting a pressing force, and detects the pressing force from the guide spring 114. The semiconductor pressure sensor 114 and the circumference electric circuit are packaged on the substrate.

Figure 3:
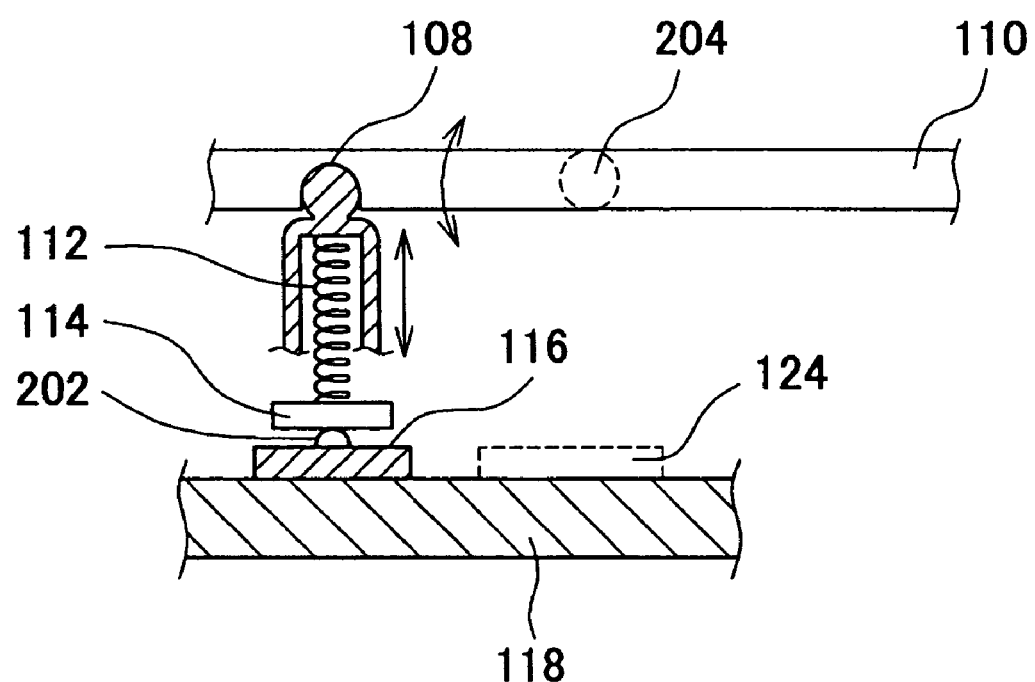
FIG. 3 is a drawing showing the operation of the mirror angle adjustment device 14.

FIG. 3 is a drawing showing the operation of the mirror angle adjustment device 14. In this embodiment, part of the spring 112 is inserted into the adjust nut 106, and applies a resilient force to the plate pivot 110 via the adjust nut 108 in the direction substantially the vertical to the mirror surface 12 (see FIG. 1). To the guide spring 114 is applied a resilient force by the spring 112 in the direction departing from the plate pivot 110.

The semiconductor pressure sensor 116 has a hemispherical contact portion 202 on the surface facing to the guide spring 114, and is in contact with the guide spring at substantially one point by bringing the apex of the contact portion 202 into contact with the guide spring 114. Also, the semiconductor pressure sensor 116 detects the load loaded on this one point from the guide spring 114.

The signal outputting portion 124, which is the circumference electric circuit of the semiconductor pressure sensor 116 is packaged on the substrate 118. The signal outputting portion 124 outputs an electric signal depending on the force detected by the semiconductor pressure sensor 116 out of the side mirror 10 (see FIG. 1).

In such a configuration, when the plate pivot 110 is tilted around the axis 204 according to the movement of the adjust nut 108 as a center, the length of the spring 112 is changed and, thus, the resilient force of the guide spring 114 applied from the spring 112 is changed. For this reason, according to such a configuration, the movement of the mirror surface 112 can be converted into the change in the load via the spring 112.

Also, depending upon the change in the resilient force, the force detected by the semiconductor pressure sensor 116 is changed. Based on the force detected by the semiconductor pressure sensor 116, the signal outputting portion 124 changes the output. As described above, the signal outputting portion 124 outputs the electric signal depending on the tilted angle of the mirror surface 12. For this reason, according to this embodiment, the tilted angle of the mirror surface 12 can be suitably detected.

Furthermore, since the guide spring 114 which guides one end of the spring 112 is in contact with the semiconductor pressure sensor 116 at one point, the variation in the output from the semiconductor pressure sensor 116 due to the influence of the tilting of the spring 112 can be prevented. Also, since the side surface of the spring 112 is guided by the inner wall of the adjust nut 108, the spring 112 can be prevented from being unnecessarily tilting. For this reason, according to this embodiment, the detection accuracy of the tilted angle of the mirror surface 12 can be enhanced, making a much more high performance mirror.

Figure 4:
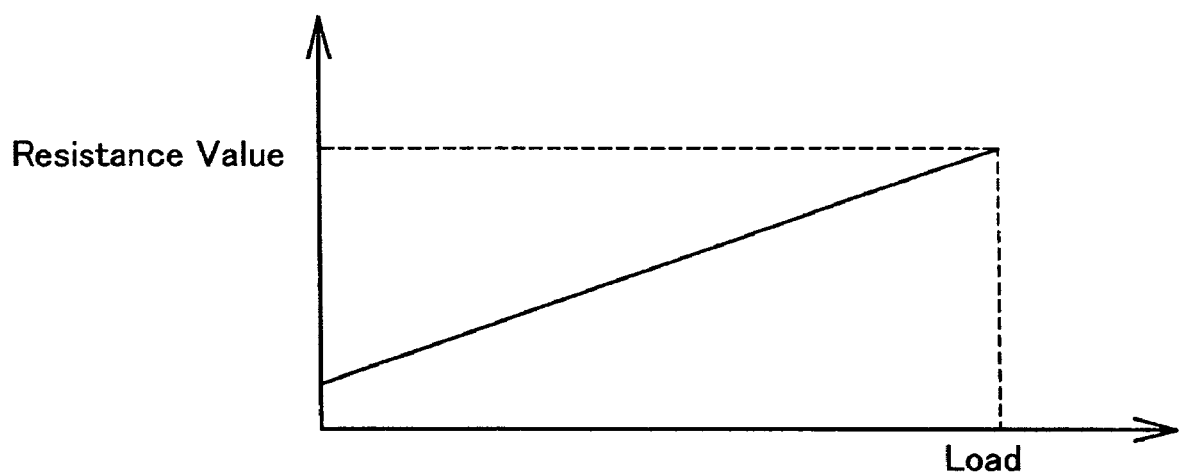
FIG. 4 is a graph showing the characteristics of the resistance element included in the semiconductor pressure sensor 116.

FIG. 4 is a graph showing the characteristics of the resistance element included in the semiconductor pressure sensor 116. In this embodiment, the resistance element included in the semiconductor pressure sensor 116 has characteristics that the resistance value is increased in proportion to the load loaded from the guide spring 114.

Figure 5A:
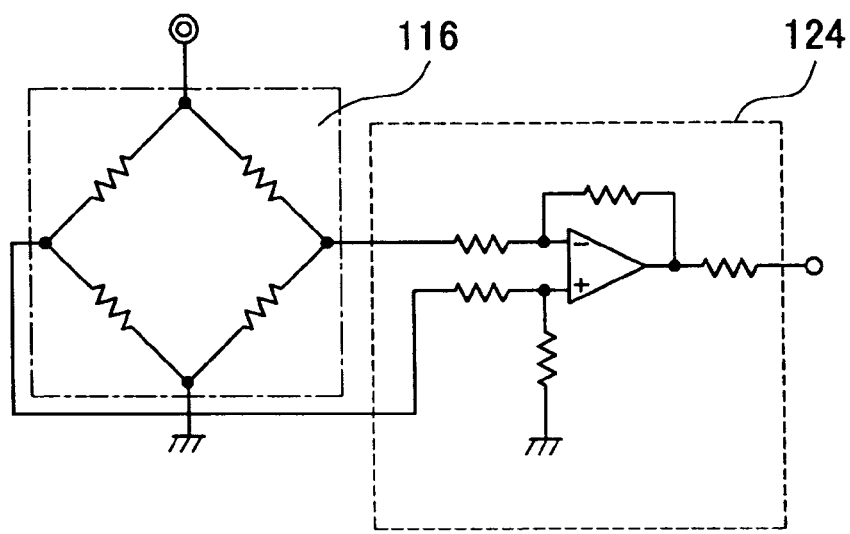
FIG. 5A shows the configurations of the semiconductor pressure sensor 116 and the signal outputting portion 124.
Figure 5B:
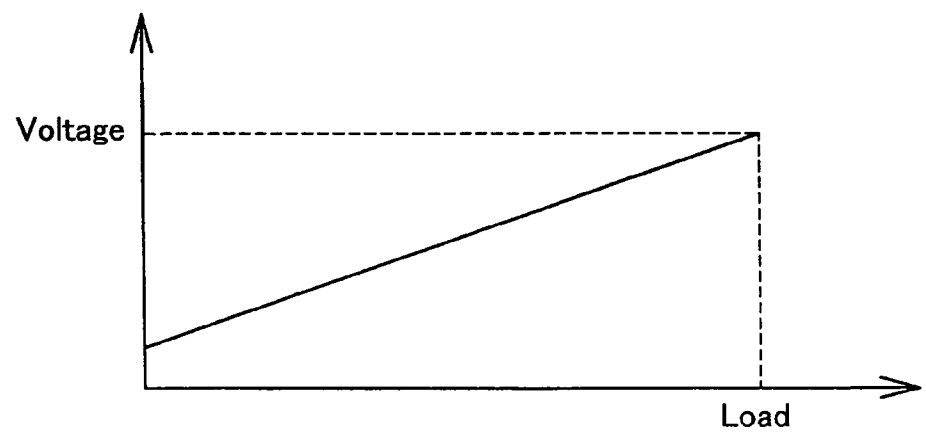
FIG. 5B is outputting characteristics if the signal outputting portion 124.

FIG. 5 is a drawing which describes the signal outputting portion 124, wherein FIG. 5A shows the configurations of the semiconductor pressure sensor 116 and the signal outputting portion 124, and FIG. 5B is outputting characteristics if the signal outputting portion 124.

The semiconductor pressure sensor 16 has four resistance elements each having a bridge structure, and outputs the change in the resistance value depending on the load as a voltage between output terminals. The signal outputting portion 124 has an operation amplifier negatively fed backed, and by this amplifier, the output voltage of the semiconductor pressure sensor 116 is operationally amplified, which is then outputted. According to this embodiment, slight change in the resistance occurring depending on the change in the load of the resistance element of the semiconductor pressure sensor 116 can be suitably converted into the change in the voltage.

FIG. 6 shows the second embodiment of the mirror angle adjustment device. The constitutions having the functions in FIG. 6 same as or similar to those shown in those of FIG. 2 to FIG. 5 are assigned to the same symbols and the description thereof will be omitted. The mirror angle adjustment device 14 of this embodiment further possesses, for example, the motor 104 and worm wheel 106 of the actuator 100 (see FIG. 2), and the like, similar to the mirror angle adjustment device described by using FIG. 2 to FIG. 5.

Figure 6A:
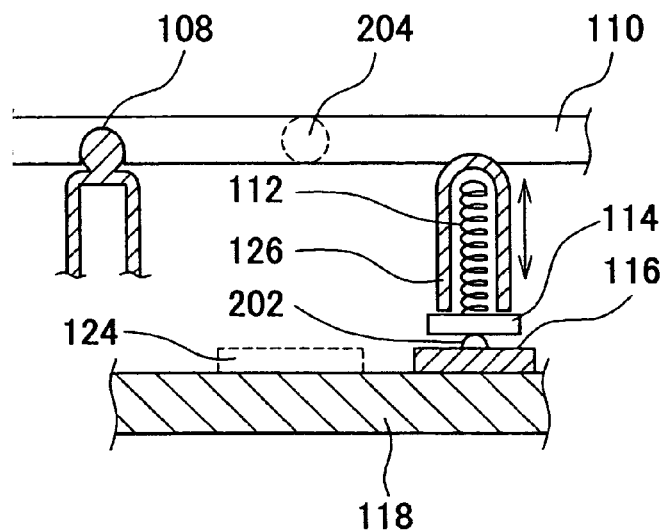
FIG. 6 is a drawing showing a second example of the configuration of the mirror angle adjustment device 14, wherein FIG. 6A outlines the configuration of the mirror angle adjustment device 14.
FIG. 6B shows the positional relation between the slide block 126 and the plate pivot 110.

FIG. 6A outlines the configuration of the mirror angle adjustment device 14. In this embodiment, the mirror angle adjustment device 14 further possesses a slide block 126 for converting the movement of the mirror surface 12 into a linear movement. The slide block 125 is a column member extending toward substantially the vertical direction to the mirror surface 12 (see FIG. 1), and is held so that while one end thereof is in contact with the plate pivot 126, and it can be moved in substantially the vertical direction to the mirror surface 12. For this reason, when the tilted angle of the mirror surface 12 is changed, according to the tilting of the plate pivot 110, the slide block 126 moves substantially the vertical direction to the mirror surface 12 to a distance corresponding an amount of the tilted angle of the mirror surface to be changed.

In this embodiment, a part of the spring 12 is inserted into the slide block 126, and the spring 12 applies a resilient force to the plate pivot 10 in substantially the vertical direction to the mirror surface 12 via the slide block 126. The guide spring 114 is applied to a resilient force by the spring 112 in the direction departing from the plate pivot 110.

Also in this configuration, when the mirror surface 12 is tilted, the length of the spring 112 is changed by the movement of the spring block 126 and, thus, the resilient force applied to the guide spring 114 from the spring 114 is changed. For this reason, also in this configuration, the tilted angle of the mirror surface 12 can be suitably detected based on the force detected by the semiconductor pressure sensor 116.

The configuration for converting the movement of the mirror surface 12 into a linear movement is not restricted to the use of the slide block 126, and, for example, other member provided on any constituting parts of the mirror surface 12, the mirror holder, the housing 120, the adjust nut 108 and the like may be used. The position on which the part for converting the movement of the mirror surface 12 into a linear movement is provided is not restricted to the interior or exterior of the actuator.

Figure 6B:
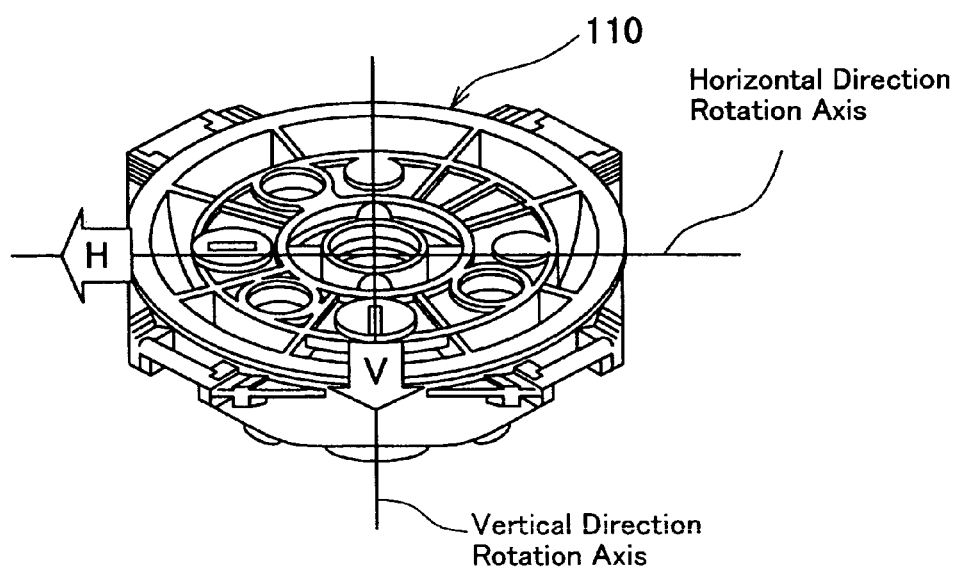

FIG. 6B shows the positional relation between the slide block 126 and the plate pivot 110. In this embodiment, the plate pivot 10 tilts around the vertical rotation axis and the horizontal rotation axis as axes. The mirror angle adjustment device 14 possesses at least one slide block 126 on the vertical rotation axis and at least one slide block 126 on the horizontal rotation axis, respectively. According to this configuration, the tilting angles of the mirror surface 12 in the vertical direction and the horizontal direction can be suitably detected, respectively.

In this configuration, there arises no problem when the slide block 126 is placed in the position on the vertical rotation axis or on the horizontal rotation axis and, thus, the slide block 126, the spring 112, the guide spring 114, the semiconductor pressure sensor 116, and the like can be placed on a room space of the actuator 100. For this reason, according to this embodiment, the space of the side mirror 10 can be effectively used.

Figure 7:
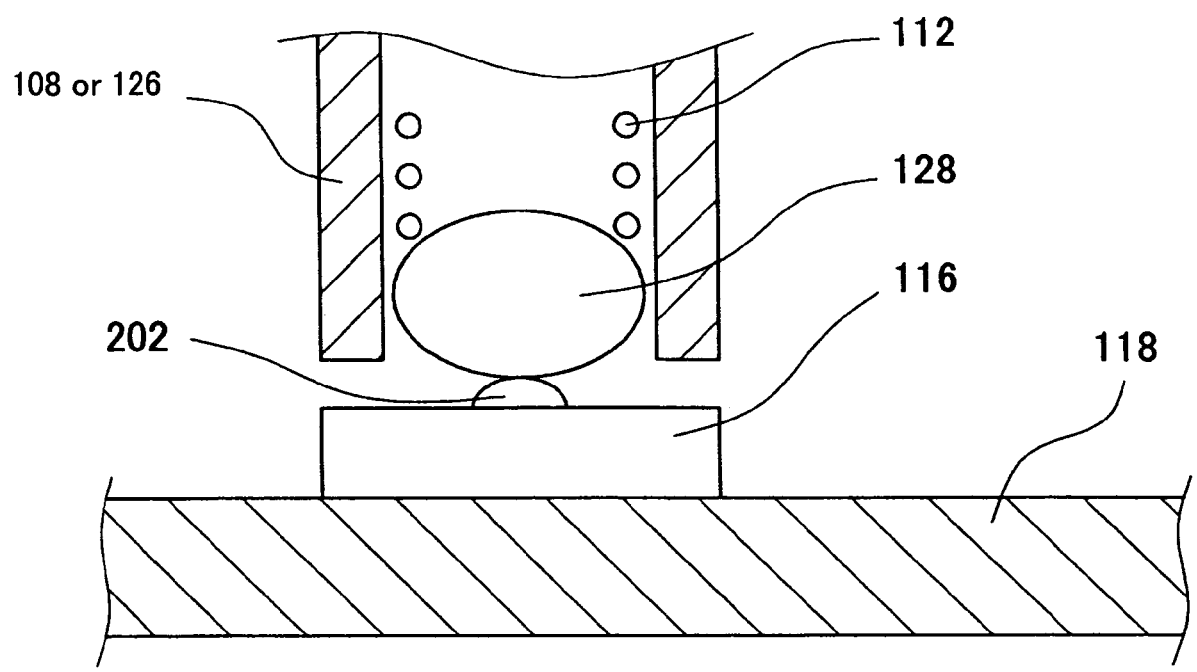
FIG. 7 is an explored perspective view showing a third example of the configuration of the mirror angle adjustment device 14.

FIG. 7 shows the third embodiment of the mirror angle adjustment device 14. The constitutions having the functions in FIG. 7 same as or similar to those shown in those of FIG. 2 to FIG. 5, or FIG. 6 are assigned to the same symbols and the description thereof will be omitted. The mirror angle adjustment device 14 of this embodiment further possesses, for example, the motor 104 and worm wheel 106 of the actuator 100 (see FIG. 2), and the like, similar to the mirror angle adjustment device described by using FIG. 2 to FIG. 5.

In this embodiment, the mirror angle adjustment device 14 has a steel ball 128 as the pressing member instead of the guide spring 114. The steel ball 128 is one example of a globular member, and is provided between the edge portion of the spring 112 and the contact portion 202 of the semiconductor pressure sensor 116. According to this configuration, the load from the spring 112 can be suitably delivered to the semiconductor pressure sensor 116. Similar to the configuration described by using FIG. 2 to FIG. 6, the spring 112 may be provided within the adjust nut 108, or similar to the configuration described by using FIG. 6, the spring 116 may be provided within the slide block 106.

Figure 8:
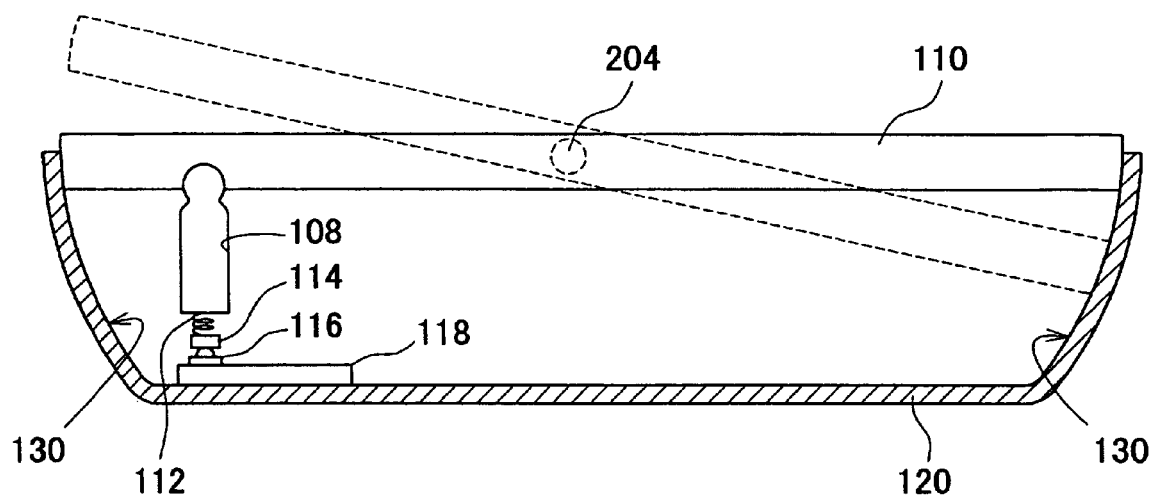
FIG. 8 is an explored perspective view showing a fourth example of the configuration of the mirror angle adjustment device 14.

FIG. 8 shows the fourth embodiment of the mirror angle adjustment device 14. The constitutions having the functions in FIG. 8 same as or similar to those shown in those of FIG. 2 to FIG. 5, or FIG. 6 are assigned to the same symbols and the description thereof will be omitted. The mirror angle adjustment device 14 of this embodiment further possesses, for example, the motor 104 and worm wheel 106 of the actuator 100 (see FIG. 2), and the like, similar to the mirror angle adjustment device described by using FIG. 2 to FIG. 5.

In this embodiment, the housing 120 is formed into a bowl shape, and possesses a sidewall portion 130 which covers at least part of the side surface of the plate pivot 110. The sidewall 130 is formed so as to be in contact with the side surface of the tilting plate pivot 110, and so as to guide the side surface of the plate pivot 110 when the plate pivot 110 is tilted.

For this reason, according to this embodiment, even if the mirror receives vibration, for example, during driving the vehicle at a high speed, the position of the plate pivot 110 is not unduly shifted, preventing variation in the load loaded on the semiconductor pressure sensor 116. For this reason, according to this embodiment, the tilted angle of the mirror surface 12 can be detected at a high accuracy.

Similar to the mirror angle detection device 14 described by using FIG. 6., the mirror angle detection device 14 of this embodiment may further have a slide block 126 (see FIG. 6). In this case, the spring 112 may be provided within the slide block 126. Also, similar to the mirror angle detection device 14 described by using FIG. 7., the mirror angle detection device 14 of this embodiment may have a steel ball (see FIG. 7) instead of the guide spring 114. In these cases, the tilted angle of the mirror surface 12 can be detected at a high accuracy.

The present invention can be suitably used, for example, as a vehicle exterior mirror.

From the aforementioned explanation, those skilled in the art ascertain the essential characteristics of the present invention and can make the various modifications and variations to the present invention to adapt it to various usages and conditions without departing from the spirit and scope of the claims.

What is claimed is:

1. A vehicle mirror comprising:

a mirror surface;

an actuator which tilts the mirror surface around an axis parallel to said mirror surface as a center;

an interlocking member which changes its direction together with the mirror surface so as to be directed toward the direction same as a direction of the mirror surface;

a spring which applies a resilient force to said interlocking member in a direction substantially vertical to the mirror surface;

a pressing member which is fitted to the end of the spring at the side far from the interlocking member;

a pressure sensor configured to detect a pressing force generated by the spring, the pressure sensor being in contact with said pressing member at substantially one point so as to detect a load loaded by the spring on said one point via the pressing member; and a signal outputting portion which outputs a signal depending upon the tilted angle of said mirror surface based on the force detected by said pressure sensor, wherein said actuator comprises a slide rod which moves toward or backward from a rear surface of said mirror surface to thereby tilt said mirror surface, and at least part of said spring is inserted into said slide rod to apply a resilient force to said interlocking member via said slide rod.

2. The mirror according to claim 1, wherein said pressure sensor comprises a semiconductor pressure sensor.

3. The mirror according to claim 2, wherein said spring is a helical spring, and said pressing member is a globular member provided between the edge of said helical spring and said pressure sensor.

4. The mirror according to claim 1, wherein said spring is a helical spring, and said pressing member is a globular member provided between the edge of said helical spring and said pressure sensor.

5. A vehicle mirror comprising:

a mirror surface;

an actuator configured to tilt the mirror surface;

an interlocking member configured to change a direction together with the mirror surface;

a spring positioned to generate a pressing force due to a tilting movement of the mirror surface;

a pressure sensor configured to detect the pressing force generated by the spring; and a signal outputting device configured to output a signal based on the pressing force detected by the pressure sensor;

wherein the actuator comprises a slide rod configured to move toward or backward from a rear surface of the mirror surface to tilt the mirror surface, and the spring is at least partly inserted into the slide rod to apply a resilient force to the interlocking member via the slide rod.

6. The vehicle mirror according to claim 5, further comprising a pressing member fitted to the end of the spring at the side far from the interlocking member, wherein the pressure sensor includes a point contact portion which is in contact with the pressing member so as to detect a load loaded by the spring on the point contact portion via the pressing member.

7. The vehicle mirror according to claim 6, wherein the spring is a helical spring, and the pressing member is a globular member provided between the edge of the helical spring and the pressure sensor.

8. The vehicle mirror according to claim 7, wherein said pressure sensor comprises a semiconductor pressure sensor.

9. The vehicle mirror according to claim 5, wherein said pressure sensor comprises a semiconductor pressure sensor.

* * * * *

UNITED STATES PATENT AND TRADEMARK OFFICE
CERTIFICATE OF CORRECTION

PATENT NO. : 7,320,527 B2  Page 1 of 1
APPLICATION NO. : 11/235211
DATED : January 22, 2008
INVENTOR(S) : Ayako Yamada et al.

It is certified that error appears in the above-identified patent and that said Letters Patent is hereby corrected as shown below:

On the title page, Item (73), the Assignee information is incorrect. Item (73) should read as follows:

-- (73)  Assignee:  Murakami Corporation, Shizuoka-shi, (JP) --

Signed and Sealed this

Thirteenth Day of May, 2008

JON W. DUDAS
*Director of the United States Patent and Trademark Office*